(12) United States Patent
Shin

(10) Patent No.: US 11,458,855 B2
(45) Date of Patent: Oct. 4, 2022

(54) ELECTRIC VEHICLE CHARGING SYSTEM USING ROBOT AND METHOD FOR CHARGING ELECTRIC VEHICLE USING SAME

(71) Applicant: LG ELECTRONICS INC., Seoul (KR)

(72) Inventor: Chang Eui Shin, Seongnam-si (KR)

(73) Assignee: LG ELECTRONICS INC., Seoul (KR)

( * ) Notice: Subject to any disclaimer, the term of this patent is extended or adjusted under 35 U.S.C. 154(b) by 421 days.

(21) Appl. No.: 16/636,987

(22) PCT Filed: Apr. 16, 2019

(86) PCT No.: PCT/KR2019/004576
§ 371 (c)(1),
(2) Date: Feb. 6, 2020

(87) PCT Pub. No.: WO2019/139463
PCT Pub. Date: Jul. 18, 2019

(65) Prior Publication Data
US 2020/0361331 A1 Nov. 19, 2020

(51) Int. Cl.
*H02J 7/00* (2006.01)
*B60L 53/37* (2019.01)
(Continued)

(52) U.S. Cl.
CPC .............. *B60L 53/37* (2019.02); *B60L 53/16* (2019.02); *B60L 53/305* (2019.02); *G08G 1/017* (2013.01); *H02J 7/0045* (2013.01)

(58) Field of Classification Search
USPC .......................... 320/106, 107, 108, 109, 110
See application file for complete search history.

(56) References Cited

U.S. PATENT DOCUMENTS

| 8,628,225 B2 | 1/2014 | Hook et al. |
| 2011/0077809 A1* | 3/2011 | Leary ............. B60L 53/14 320/109 |

(Continued)

FOREIGN PATENT DOCUMENTS

| CN | 107738585 A | * | 2/2018 |
| CN | 109435730 A | * | 3/2019 |

(Continued)

*Primary Examiner* — Brian Ngo
(74) *Attorney, Agent, or Firm* — Birch, Stewart, Kolasch & Birch, LLP

(57) ABSTRACT

An electric vehicle charging system using a robot and a charging method using the same are disclosed. The electric vehicle charging system using a robot, for connecting a charging connector to a charging socket of the electric vehicle, includes a robot arm for moving and rotating the charging connector, an image acquirer installed in the robot arm so as to generate image information of the charging socket, and a controller for controlling operation of the robot arm and the image acquirer. The image acquirer includes a first light controller provided with a first lamp and a first illuminance sensor, a second light controller installed at an opposite side of the first light controller with respect to the charging connector, and provided with a second lamp and a second illuminance sensor, and a camera capturing an image of the charging socket.

20 Claims, 11 Drawing Sheets

(51) Int. Cl.
  *B60L 53/30* (2019.01)
  *B60L 53/16* (2019.01)
  *G08G 1/017* (2006.01)

(56) References Cited

U.S. PATENT DOCUMENTS

| | | | |
|---|---|---|---|
| 2013/0076902 A1* | 3/2013 | Gao | B60L 53/35 |
| | | | 348/148 |
| 2017/0008411 A1* | 1/2017 | Wu | B60L 58/12 |
| 2017/0008412 A1* | 1/2017 | Wu | B60L 53/305 |
| 2018/0141450 A1* | 5/2018 | Oh | G01S 17/06 |
| 2020/0361331 A1* | 11/2020 | Shin | B60L 53/37 |

FOREIGN PATENT DOCUMENTS

| | | | | |
|---|---|---|---|---|
| CN | 109532522 A | * | 3/2019 | ............ B62D 63/02 |
| DE | 102018006749 A1 | * | 3/2019 | |
| JP | 2012-120402 A | | 6/2012 | |
| KR | 10-0883889 B1 | | 2/2009 | |
| KR | 10-1016011 B1 | | 2/2011 | |
| KR | 10-1075944 B1 | | 10/2011 | |
| KR | 10-1410272 B1 | | 6/2014 | |
| KR | 10-1792792 B1 | | 11/2017 | |
| KR | 10-2018-0046600 A | | 5/2018 | |

\* cited by examiner

ELECTRIC VEHICLE CHARGING SYSTEM USING ROBOT AND METHOD FOR CHARGING ELECTRIC VEHICLE USING SAME

CROSS-REFERENCE TO RELATED APPLICATIONS

This application is the National Phase of PCT International Application No. PCT/KR2019/004576, filed on Apr. 16, 2019, the entirety of which is hereby expressly incorporated by reference into the present application.

TECHNICAL FIELD

The present disclosure relates to an electric vehicle charging system using a robot and a method for charging the electric vehicle using the same. More specifically, the present disclosure relates to an electric vehicle charging system for automatically charging a battery embedded in the electric vehicle using a robot, and a method for charging the electric vehicle using the same.

BACKGROUND ART

An electric vehicle is a vehicle that generates driving force by supplying electric energy to an electric motor using a high-voltage battery embedded therein, the battery of which thus needs to be charged via an external power supply. Accordingly, it is necessary to use a charger for supplying power to the electric vehicle.

In this regard, in Korean Patent Application Publication No. 2018-0046600 (hereinafter referred to as "Related Art 1"), an apparatus and method for charging an electric vehicle is disclosed. The apparatus for charging the electric vehicle disclosed in Related Art 1 includes a grab unit for gripping a charging gun detachably coupled to the electric vehicle, and an alignment unit for moving the grab unit. The charging gun is electrically connected to a power module which provides charging power to the electric vehicle, and is mounted in a holder of a kiosk facing the electric vehicle. The alignment unit allows the grab unit to be aligned at a first position facing the holder, or allows the grab part to be aligned at a second position facing a connector of the electric vehicle.

In addition, in Related Art 1, a sensing means for recognizing a position of the connector of the electric vehicle is disclosed. The sensing means includes, in the grab unit or the alignment part, a photographing unit for photographing the connector of the electric vehicle, and a recognition unit for recognizing the connector position of the electric vehicle by analyzing an image captured by the photographing unit. Upon recognition of the connector position of the electric vehicle through the photographing unit or the recognition unit, the alignment unit may specify a second position using the connector position information recognized by the recognition unit, and may align the grab unit at the specified second position.

Generally, image recognition may be achieved by comparing similarity of attributes extracted from a reference image and attributes extracted from an input image. A representative method for comparing similarity between the reference image and the input image is a region-based method that centers on matching features over the entire region of the images.

In particular, image recognition in the widely-used region-based method uses a difference in distance or correlation between a reference image and an input image as a measure of similarity between the reference image and the input image. Image similarity comparison based on the distance between target images, although having a low computational load, has disadvantages in that it is not possible to compare constituent elements of the target images, and there is a high classification error when the difference in average values between the target images is large. In contrast, image similarity comparison based on the correlation between target images, although capable of comparing constituent components of the target images with each other and at the same time implementing location-free and scale-free characteristics, has disadvantages in that there is a high computational load.

Meanwhile, methods for measuring distance may be classified into a vector approach method and a probabilistic approach method, and methods for measuring correlation may be classified into a cross-correlation method and an auto-correlation method. Generally, classification based on correlation may be achieved by comparing similarity between the reference image and the input image. However, the correlation-based classification may be unable to perform image recognition if image energy changes according to position, and is highly sensitive to linear changes of illumination.

Accordingly, Related Art 1 has disadvantages in that installation of a lighting device for evenly illuminating the connector of the electric vehicle is needed in order to increase the similarity between a current image (i.e., the input image) captured by the photographing unit and the existing input image (i.e., the reference image).

However, in most existing charging stations for charging electric vehicles, a user has to directly connect a charging connector of the charging station to a charging socket of a target electric vehicle, in a manner similar to that used in common gas stations. As such, a direct lighting device for illuminating the entire area around the electric vehicle is generally installed at the existing charging stations. As a result, there are practical difficulties in matching the input image of the charging socket of the target electric vehicle with the stored reference image.

In this regard, U.S. Pat. No. 8,628,225 (hereinafter referred to as "Related Art 2") discloses a charge port illumination system for an electric vehicle, which includes a charge port embedded in the electric vehicle for electrically connecting to a charging source to charge the electric vehicle, and a self-contained (independent) sealed module having at least one illumination source. The illumination source operates by contact or movement of a cover panel of the charge port, by a signal of a remote signaling device, or by a signal of a motion detection device, to thereby illuminate the charge port of the electric vehicle. The illumination source is installed at a rear side of a bezel portion of the charge port, to thereby illuminating the charge port.

However, in Related Art 2, it is disclosed that the illumination source is installed at the rear side of the bezel portion of the charge port and illuminates the charge port, and as such, the bezel portion is very bright while the remaining parts other than the bezel portion are relatively dark. Therefore, Related Art 2 has a disadvantage in that, due to a large difference in illuminance between the bezel portion and the remaining parts other than the bezel portion, only the position of the bezel portion can be recognized by analyzing the input image and the reference image.

In addition, most commercially available electric vehicles currently on the market do not have illumination devices in their charging sockets (i.e., connectors). Therefore, the applicant of the present disclosure undertook to research a charging system capable of matching an input image of a charging socket captured during charging of an electric vehicle with a stored reference image, regardless of the presence or absence of a self-illumination device embedded in the charging socket.

Meanwhile, the exterior of the electric vehicle around the charging socket forms a mostly uniformly processed curved surface, which results in uniform scattered reflection of light emitted from external illumination devices. However, an opened cover of the charging socket forms a non-continuous surface with the exterior of the electric vehicle around the charging socket, and thus prevents the uniform illumination of the charging socket of the electric vehicle from the light emitted from the external illumination devices. Therefore, the applicant of the present disclosure undertook to research technology for solving said issues relating to an illuminance imbalance in the charging socket due to light being reflected from the opened cover of the charging socket.

DISCLOSURE OF INVENTION

Technical Problem

The present disclosure is directed to providing an electric vehicle charging system using a robot, capable of showing a high similarity between an input image captured in an electric vehicle charging process and a reference image to be compared with the input image, regardless of the presence or absence, or category, of illumination devices located around the electric vehicle, and a method for charging the electric vehicle using the same.

The present disclosure is further directed to providing an electric vehicle charging system using a robot, capable of matching, with a high degree of probability, an input image captured in an electric vehicle charging process with a reference image to be compared with the input image, regardless of the presence or absence of a self-illumination device in the charging socket, and a method for charging the electric vehicle using the same.

The present disclosure is further directed to providing an electric vehicle charging system using a robot, capable of improving validity of an input image captured in an electric vehicle charging process by eliminating an illuminance imbalance in a charging socket due to light being reflected from an opened cover of the charging socket, and a method for charging the electric vehicle using the same.

Solution to Problem

According to an embodiment of the present disclosure, an electric vehicle charging system using a robot, configured to connect a charging connector to a charging socket of an electric vehicle, may include a robot arm configured to move and rotate the charging connector, an image acquirer installed in the robot arm and configured to generate image information of the charging socket, and a controller configured to control operation of the robot arm the image acquirer.

The image acquirer may include a first light controller provided with a first lamp and a first illuminance sensor, a second light controller installed at an opposite side of the first light controller with respect to the charging connector and provided with a second lamp and a second illumination sensor, and a camera configured to operate and perform photographing in a state in which the first lamp and the second lamp are turned on.

The first illuminance sensor may measure the illuminance of light reflected by the charging socket in a state in which the second lamp is turned on, and the second illuminance sensor may measure the illuminance of light reflected by the charging socket in a state in which the first lamp is turned on.

A middle point between the first lamp and the second lamp may coincide with the axis of rotation of the robot arm, and when the robot arm rotates, the first lamp and the second lamp may move in a circumferential direction about the axis of rotation of the robot arm.

An angle between the camera and the first lamp with respect to the axis of rotation of the robot arm may be identical to an angle between the camera and the second lamp with respect to the axis of rotation of the robot arm.

When a difference in measurement values between the first illuminance sensor and the second illuminance sensor is higher than a reference value, the controller may rotate the robot arm about the charging connector so as to minimize the amount of light reflected by an opened cover of the charging socket, and may then operate the camera.

The robot arm may include a body configured to hold the charging connector, and a rotating body rotatably mounted on the body, and configured to include the camera, the first light controller, and the second light controller. When the difference in measurement values between the first illuminance sensor and the second illuminance sensor is higher than the reference value, the controller rotates the rotating body.

An inner gear may be coupled to the rotating body, and a stepper motor and a pinion may be installed in the body. The controller may control operation of the stepper motor, and the rotating body may rotate when the stepper motor rotates the pinion.

In addition, according to another embodiment of the present disclosure, an electric vehicle charging system using a robot, configured to connect a charging connector to a charging socket of an electric vehicle, may include a controller configured to store position information of the charging socket relative to the electric vehicle, a robot arm configured to move and rotate the charging connector, a first light controller and a second light controller which radiate light onto the charging socket and measure the illuminance of the reflected light, and a camera installed in the robot arm, and configured to operate and perform photographing in a state in which the first light controller and the second light controller are radiating light.

The first light controller and the second light controller may be installed in the robot arm at opposite sides with respect to the charging connector. When the first light controller radiates light, the second light controller may measure the illuminance of the radiated light, and when the second light controller radiates light, the first light controller may measure illuminance of the irradiated light.

The controller may operate the camera when a difference in illuminance measurement values between the first light controller and the second light controller is equal to or less than a reference value.

An angle between the camera and the first light controller with respect to the axis of rotation of the robot arm may be identical to an angle between the camera and the second light controller with respect to the axis of rotation of the robot arm.

When the difference in illuminance measurement values between the first light controller and the second light controller is higher than a reference value, the controller may rotate the robot arm about the charging connector so as to minimize the amount of light reflected by an opened cover of the charging socket, and may then operate the camera.

In addition, according to another embodiment of the present disclosure, an electric vehicle charging method using an electric vehicle charging system using a robot may include a moving step, a first measurement step, a second measurement step, a determining step, a photographing step, a matching step, and a connection step.

The moving step may include moving a charging connector to the front of a charging socket of the electric vehicle by a robot arm, and the first measurement step may include performing a first measurement in which a first lamp installed in the robot arm is turned on and a second illuminance sensor installed in the robot arm measures illuminance of light reflected by the charging socket.

The second measurement step may include performing a second measurement in which a second lamp installed in the robot arm is turned on and a first illuminance sensor installed in the robot arm measures illuminance of light reflected by the charging socket, and the determining step may include determining whether a difference in measurement values between the first illuminance sensor and the second illuminance sensor is higher than a reference value.

When the difference in measurement values between the first illuminance sensor and the second illuminance sensor is equal to or less than the reference value, the photographing step is started. The photographing step may include performing photographing by the camera installed in the robot arm in a state in which the first lamp and the second lamp are turned on, so as to generate real-time image information of the charging socket.

The matching step may include matching the real-time image information of the charging socket with reference image information of the charging socket, so as to generate real-time position information of the charging socket, and the connection step may include connecting the charging connector to the charging socket by moving the robot arm based on the real-time position information of the charging socket.

That is, a possibility that the real-time image information of the charging socket matches the reference image information of the charging socket may be determined, by comparing the difference in measurement values between the first illuminance sensor and the second illuminance sensor with the reference value The first lamp and the first illuminance sensor may be installed at an opposite side to the second lamp and the second illuminance sensor with respect to the charging connector.

Further, when the difference in measurement values between the first illuminance sensor and the second illuminance sensor is higher than the reference value in the determining step, the robot arm may be rotated about the charging connector so as to minimize the amount of light reflected by an opened cover of the charging socket, and the method may be re-performed from the first measurement step onward.

Furthermore, the moving step may include a pre-moving step, a pre-photographing step, a pre-matching step, a predicting step, and a post-moving step.

The pre-moving step may include moving the robot arm based on reference position information of the charging socket such that the charging connector is positioned in front of the charging socket, and the pre-photographing step may include photographing a closed cover of the charging socket using the camera, in a state in which the first lamp and the second lamp are turned on, thereby generating real-time image information of the cover.

The pre-matching step may include generating real-time position information of the cover by matching the real-time image information of the cover with reference image information of the cover, and the predicting step may include generating predicted position information of the charging socket based on the real-time position information of the cover and relative position information of the charging socket.

The post-moving step may include moving the robot arm based on the predicted position information of the charging socket such that the charging connector is positioned in front of the charging socket.

After completion of the post-moving step, the cover is opened and the charging socket is exposed, and the robot arm may move toward the charging socket so as to increase the amount of light of the first lamp and the second lamp radiated onto the charging socket.

Before the moving step, a search step may be performed in which a surveillance camera photographs a license plate of the electric vehicle, and determines whether basic information of the photographed electric vehicle is stored. When the basic information of the electric vehicle is not found in the search step, a basic information input window may be outputted to an output interface. The basic information of the electric vehicle may include type information of the electric vehicle and reference position information of the charging socket.

In addition, according to another embodiment of the present disclosure, an electric vehicle charging method using an electric vehicle charging system using a robot may include a moving step, a first measurement step, a second measurement step, a determining step, a photographing step, a matching step, and a connection step. In this case, a camera, a first light controller, and a second light controller may be installed in a robot arm, the first light controller may include a first lamp and a first illuminance sensor, and the second light controller may include a second lamp and a second illuminance sensor.

In the moving step, the robot arm may hold a charging connector, and move the charging connector to be in front of the charging socket. In the first measurement step, a first measurement may be performed in which the first lamp may radiate light onto the charging socket, and the second illuminance sensor may measure the illuminance of reflected light. In the second measurement step, a second measurement may be performed in which the second lamp may radiate light onto the charging socket, and the first illuminance sensor may measure the illuminance of reflected light.

The determining step may include determining whether a difference in measurement values between the first illuminance sensor and the second illuminance sensor is higher than a reference value. The photographing step may include, when the difference in measurement values between the first illuminance sensor and the second illuminance sensor is equal to or less than the reference value, performing photographing by the camera in a state in which the first lamp and the second lamp are turned on, so as to generate real-time image information of the charging socket.

The matching step may include matching the real-time image information of the charging socket with reference image information of the charging socket, so as to generate real-time position information of the charging socket, and the connection step may include connecting the charging connector to the charging socket by moving the robot arm based on the real-time position information of the charging socket.

That is, the difference in measurement values between the first illuminance sensor and the second illuminance sensor is compared with the reference value, and validity of the real-time image information of the charging socket may be determined according to the result of comparison.

Further, the second light controller may be installed at an opposite side of the first light controller with respect to the charging connector, and when the difference in measurement values between the first illuminance sensor and the second illuminance sensor is higher than the reference value in the determining step, the robot arm may be rotated about the charging connector so as to minimize an amount of light reflected by an opened cover of the charging socket, and the method may be re-performed from the first measurement step onward.

Advantageous Effects of Invention

Embodiments of the present disclosure may provide an electric vehicle charging system using a robot, capable of showing a high similarity between an input image captured in an electric vehicle charging process and a reference image to be compared with the captured input image, regardless of the presence or absence, or category, of illumination devices located around the electric vehicle, by minimizing the amount of light reflected by an opened cover of a charging socket by rotating a robot arm about a charging connector when a difference in measurement values between a first illuminance sensor and a second illuminance sensor is higher than a reference value.

Further, the embodiments of the present disclosure may provide an electric vehicle charging system using a robot and a method for charging an electric vehicle using the same, capable of matching, with a high degree of probability, the input image captured in the electric vehicle charging process with a reference image to be compared with the input image, regardless of the presence or absence of a self-illumination device in the charging socket, by determining the possibility that the real-time image information of the charging socket matches the reference image information of the charging socket by comparing a difference in measurement values between the first illuminance sensor and the second illuminance sensor with a reference value.

In addition, the embodiments of the present disclosure may provide an electric vehicle charging system using a robot and a method for charging an electric vehicle using the same, capable of improving validity of an input image captured in the electric vehicle charging process by eliminating an illuminance imbalance in a charging socket due to light being reflected from the opened cover of the charging socket, by minimizing the amount of light reflected by the opened cover of the charging socket by rotating the robot arm about the charging connector when it is determined in a determining step that the difference in measurement values between the first illuminance sensor and the second illuminance sensor is higher than a reference value.

BRIEF DESCRIPTION OF DRAWINGS

The foregoing and other objects, features, and advantages of the invention, as well as the following detailed description of the embodiments, will be better understood when read in conjunction with the accompanying drawings. For the purpose of illustrating the invention, there is shown in the drawings an exemplary embodiment that is presently preferred, it being understood, however, that the invention is not intended to be limited to the details shown because various modifications and structural changes may be made therein without departing from the spirit of the invention and within the scope and range of equivalents of the claims. The use of the same reference numerals or symbols in different drawings indicates similar or identical items.

BEST MODE FOR CARRYING OUT THE INVENTION

Reference will now be made in detail to the embodiments of the present disclosure, examples of which are illustrated in the accompanying drawings. Wherever possible, the same reference numbers will be used throughout the drawings to refer to the same or like parts. In the following description, known functions or structures, which may confuse the substance of the present disclosure, are not explained.

Figure 1:
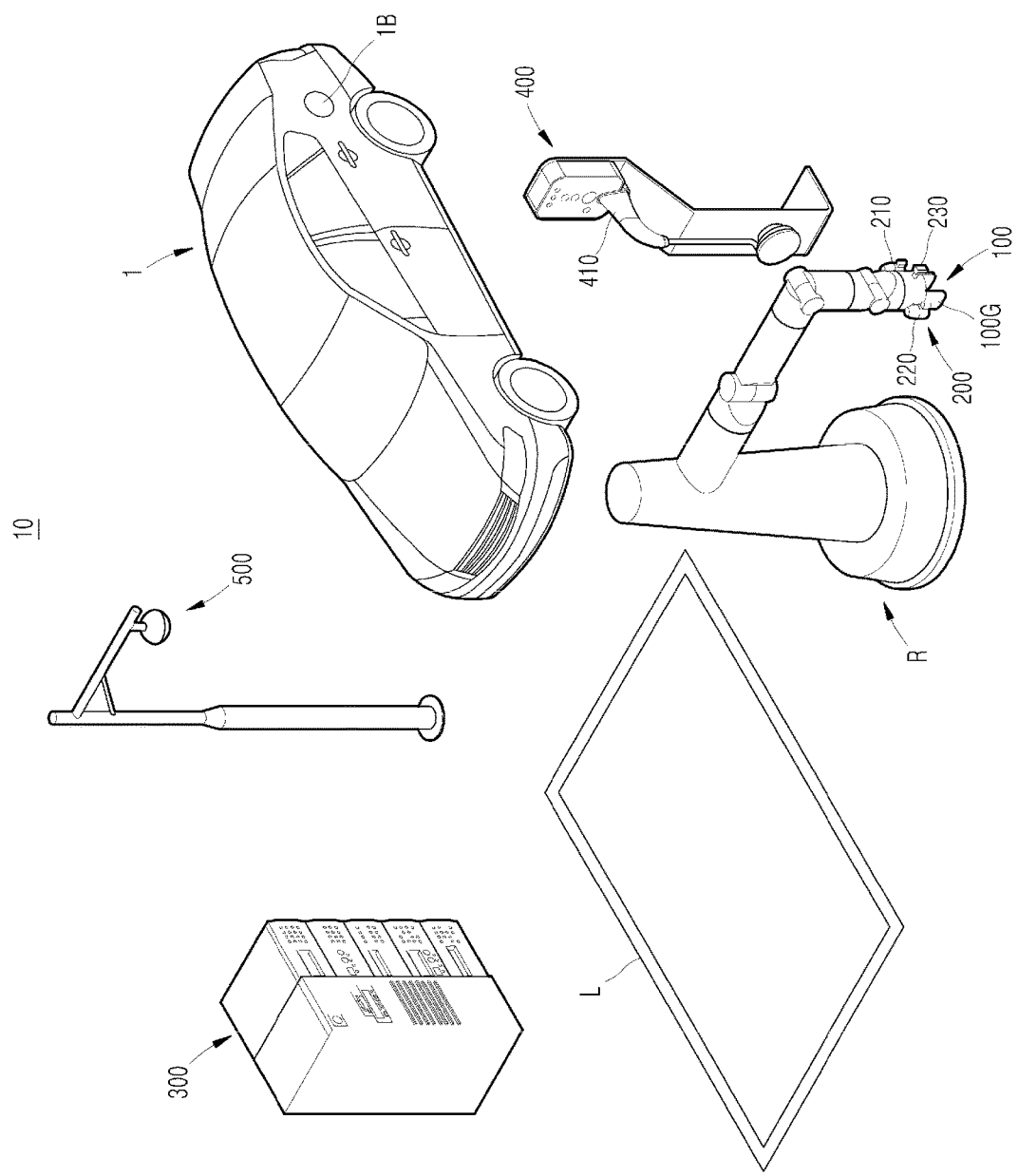
FIG. 1 is a perspective view illustrating an electric vehicle charging system according to an embodiment of the present disclosure.
Figure 2:
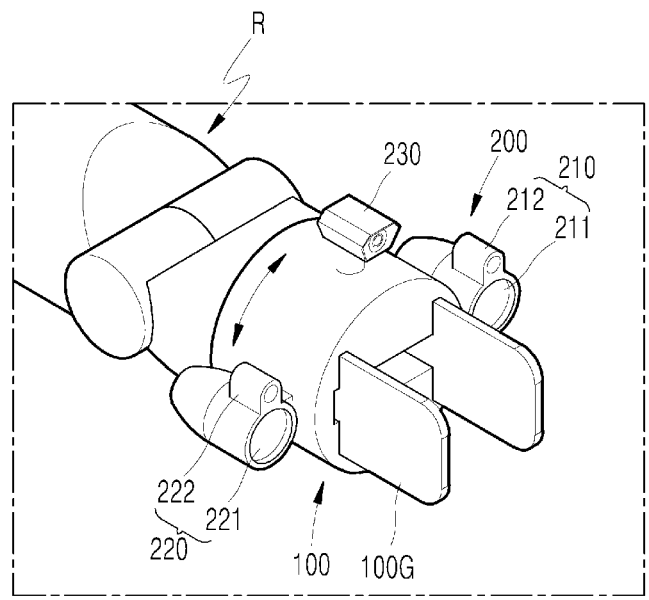
FIG. 2 is a partially enlarged view illustrating a robot arm of the electric vehicle charging system shown in FIG. 1.
Figure 3:
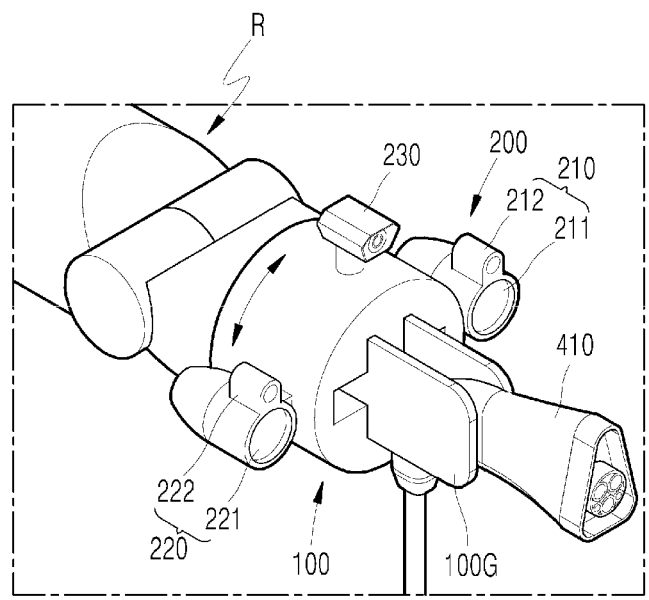
FIG. 3 is a partially enlarged view illustrating a state in which the robot arm of the electric vehicle charging system shown in FIG. 1 is holding a charging connector.

FIG. 1 is a perspective view illustrating an electric vehicle charging system 10 according to an embodiment of the present disclosure. FIG. 2 is a partially enlarged view illustrating a robot arm of the electric vehicle charging system 10 shown in FIG. 1. FIG. 3 is a partially enlarged view illustrating a state in which the robot arm of the electric vehicle charging system 10 shown in FIG. 1 is holding a charging connector.

Referring to FIG. 1, the electric vehicle charging system 10 according to an embodiment of the present disclosure is a system for connecting a charging connector 410 to a charging socket 1A of the electric vehicle 1. The electric vehicle charging system 10 is configured to automatically charge a battery embedded in the electric vehicle 1 when the electric vehicle 1 stops at a stop position, and to include a robot arm 100, an image acquirer 200, a controller 300, and a charger 400.

The robot arm 100 is configured to move and rotate the charging connector 410. As shown in FIG. 1, the robot arm 100 may denote the end part of a multi-axis robot arm R. Here, the robot arm 100 moving the charging connector 410 may denote movement of the robot arm 100 by an operation of the multi-axis robot arm R. Further, the robot arm 100 rotating the charging connector 410 may denote rotation of the robot arm 100 by an operation of the multi-axis robot arm R.

In Korean Patent Application Publication No. 2018-0046600, disclosed is a robot arm R that may, when a rail is installed on the ground, move along the rail on the ground. Further disclosed is Korean Patent Application Publication No. 2018-0046600 is a robot arm which may be movably or rotatably mounted on a mobile robot.

Referring to FIGS. 2 and 3, a pair of grippers 100G for holding the charging connector 410 is mounted on the robot arm 100. The grippers 100G may, when moved close to each other, hold the charging connector 410, or may release the charging connector 410 when moved away from each other.

The image acquirer 200 may be configured to generate real-time image information of the charging socket 1A, and may be installed in the robot arm 100. Real-time image information of the charging socket 1A denotes image data of the charging socket 1A that is photographed in real time by a camera 230. The image acquirer 200 is configured to include a first light controller 210, a second light controller 220, and the camera 230.

Referring to FIGS. 2 to 8, the first light controller 210 and the second light controller 220 (in a state in which the grippers 100G are holding the charging connector 410) may be installed in the robot arm 100 at opposite sides to each other with respect to the charging connector 410. Accordingly, the distance between the first light controller 210 and the second light controller 220 may be larger than the horizontal width of the robot arm 100.

Figure 5:
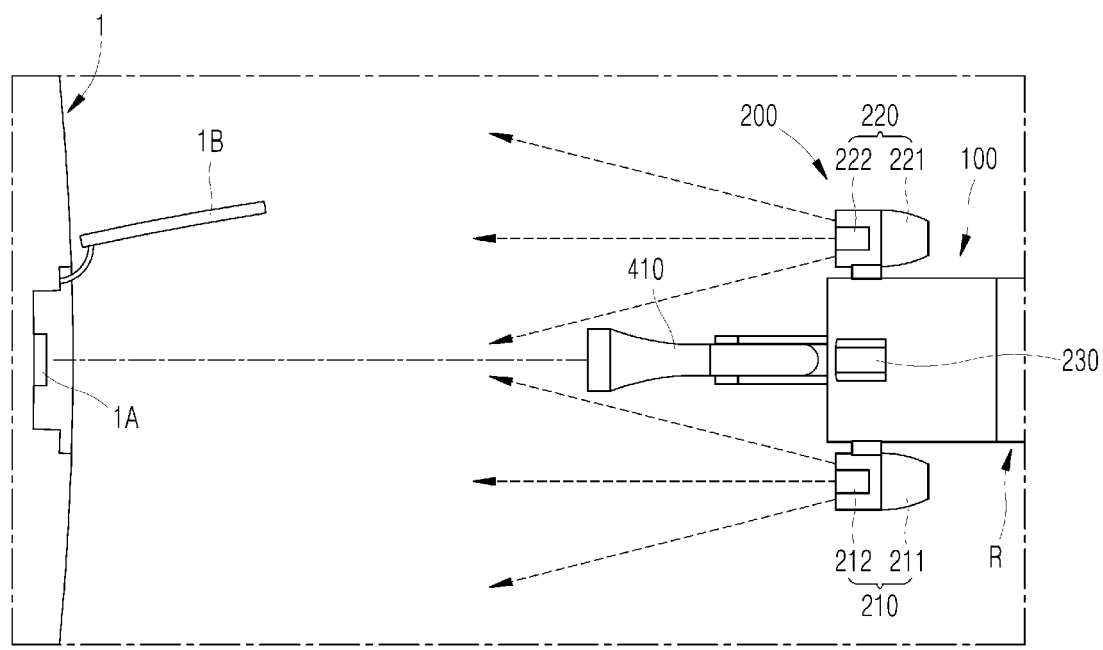
FIG. 5 is a top view illustrating a moving step of the electric vehicle charging method shown in FIG. 4.

The first light controller 210 is configured to include a first lamp 211 and a first illuminance sensor 212, and the second light controller 220 is configured to include a second lamp 221 and a second illuminance sensor 222. Referring to FIG. 5, the radiation directions of the first lamp 211 and the second lamp 221 are parallel to one another. The first lamp 211 and the second lamp 211 may comprise an LED lamp.

Figure 8:
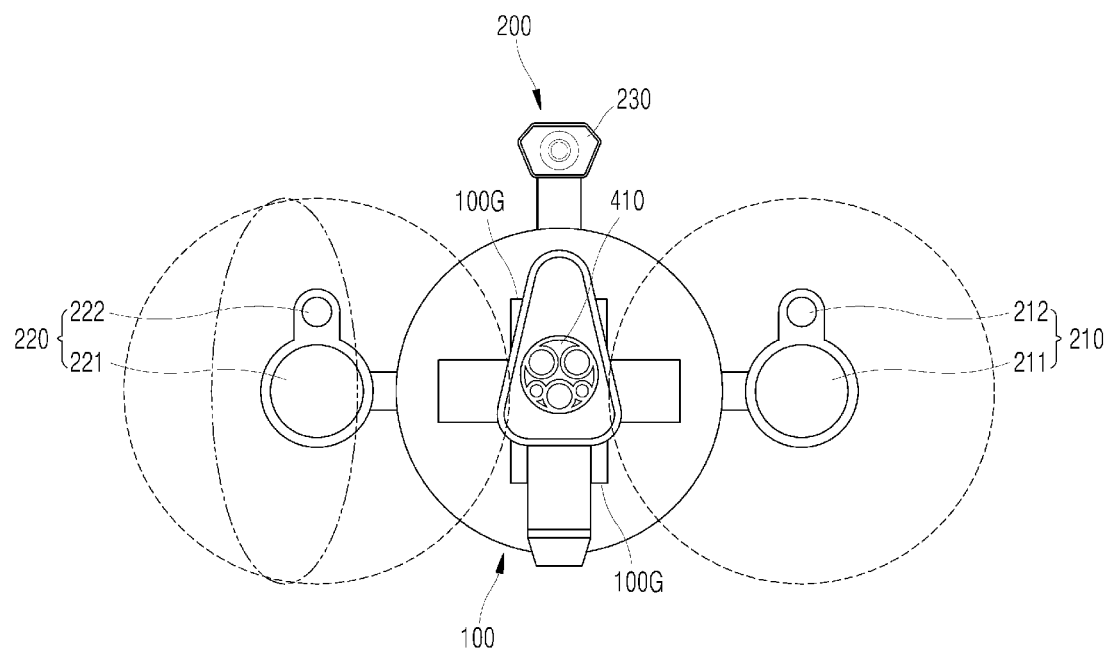
FIG. 8 is a front view illustrating a first measurement step and a second measurement step of the electric vehicle charging method shown in FIG. 4.

Referring to FIG. 8, the middle point between the first lamp 211 and the second lamp 221 may coincide with the axis of rotation of the robot arm 100. Accordingly, when the robot arm 100 rotates, the first lamp 211 and the second lamp 211 may move in a circumferential direction about the axis of rotation of the robot arm 100.

The camera 230 is configured to photograph the charging socket 1A, and is installed in the robot arm 100. The camera 230 may photograph the charging socket 1A in a state in which the first lamp 211 and the second map 211 are turned on.

Referring to FIG. 8, the camera 230 may be installed in the robot arm 100 at a position where the angle between the camera and the first lamp 211 with respect to the axis of rotation of the robot arm 100 is identical to the angle between the camera and the second lamp 221 with respect to the axis of rotation of the robot arm 100. That is, the angle between the camera 230 and the first lamp 211 with respect to the axis of rotation of the robot arm 100 may be 90 degrees (90°), and the angle between the camera and the second lamp 221 with respect to the axis of rotation of the robot arm 100 may be 90 degrees (90°).

When the second lamp 221 is turned on, the first illuminance sensor 212 measures the illuminance of reflected light. When the first lamp 211 is turned on, the second illuminance sensor 222 measures the illuminance of reflected light. Therefore, if a surface reflecting the light (hereinafter referred to as a "reflection surface") is symmetrical with respect to the axis of rotation of the robot arm 100, a measurement value of the first illuminance sensor 212 may be identical to a measurement value of the second illuminance sensor 222.

However, in a state in which the cover 1B of the charging socket 1A is open, the reflection surface denotes a surface of the electric vehicle 1 that approximately centers on the charging socket 1A. Since it is impossible for the surface of the electric vehicle 1 that centers on the charging socket 1A to be symmetrical to the axis of rotation of the robot arm 100, the possibility that the measurement value of the first illuminance sensor 212 is the same as the measurement value of the second illuminance sensor 222 is very low.

As shown in FIG. 1, a charger 400 is configured to supply electric energy to the battery of the electric vehicle 1, and is provided within the range of movement or rotation distance of the robot arm 100. The robot arm 100 moves the charging connector 410 included in the charger 400 to the front of the charging socket 1A.

The charger 400 may be fast-charging or slow-charging. The charger 400 may be provided with at least one charging connector 410. In other words, the charging connector 410 may be at least one of an AC single-phase 5-pin, an AC 3-phase 7-pin, a DC CHAdeMO 10-pin, and a DC combo 7-pin.

The controller 300 is configured to control the robot arm 100 and the image acquirer 200, and may be a server configured to communicate with the robot arm 100 and the image acquirer 200 by wire or wirelessly.

When a difference in measurement values between the first illuminance sensor 212 and the second illuminance sensor 222 is higher than a reference value, the controller 300 rotates the robot arm 100 about the charging connector 410 so as to minimize the amount of light reflected by the opened cover 1B of the charging socket 1A, and then operates the camera 230. The control of the robot arm 100 and the image acquirer 200 by the controller 300 will hereinafter be described with reference to an electric vehicle charging method S100 using an electric vehicle charging system.

Figure 4:
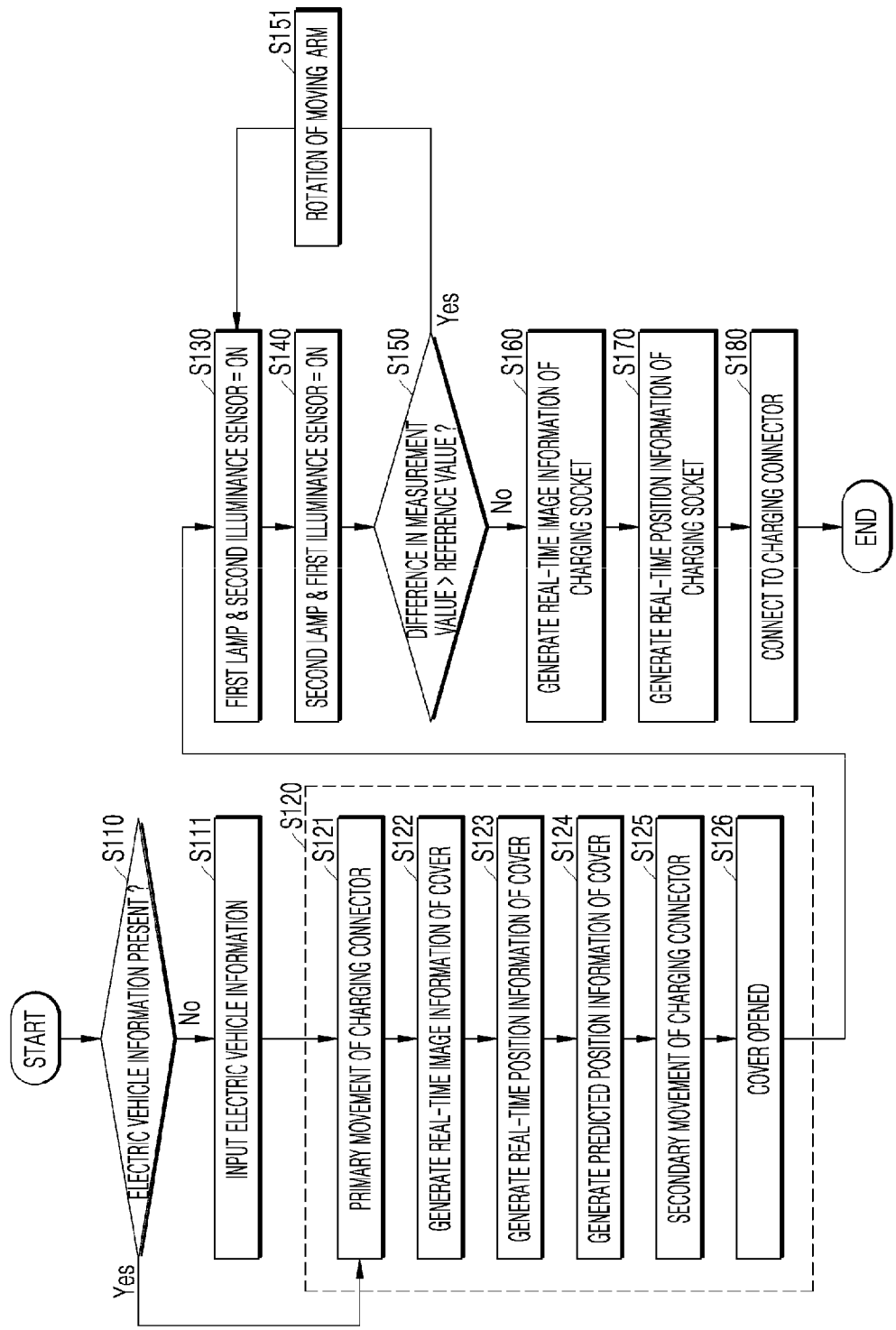
FIG. 4 is a flowchart illustrating an electric vehicle charging method using an electric vehicle charging system according to an embodiment of the present disclosure.

FIG. 4 is a flowchart illustrating an electric vehicle charging method S100 using an electric vehicle charging system according to an embodiment of the present disclosure.

Referring to FIG. 4, the electric vehicle charging method S100 using the electric vehicle charging system according to this embodiment of the present disclosure may include a search step S110, a moving step S120, a first measurement step S130, a second measurement step S140, a determining step S150, a photographing step S160, a matching step S170, and a connection step S180. The controller 300 controls the robot arm 100 and the image acquirer 200 in stages, in each step of the electric vehicle charging method S100.

In the search step S110, the controller 300 determines whether basic information of the electric vehicle 1 has been stored. The search step S110 is started when a surveillance camera 500 photographs a license plate of the electric vehicle 1. Referring to FIG. 1, the surveillance camera 500 automatically photographs the license plate of the electric vehicle 1, which is moving toward a stop line L.

An apparatus and method for recognizing a vehicle type using a contour image of a target vehicle is disclosed in Korean Patent Registration No. 883889, and a CCTV system for recognizing a license plate number and a method for operating the same is disclosed in Korean Patent Registration No. 1016011. As such, technology for recognizing a license plate number of a vehicle by photographing a license plate of the vehicle is well known in the art, and thus a detailed description thereof will herein be omitted for convenience of description.

The basic information of the electric vehicle 1 includes vehicle type information and reference position information of the charging socket 1A. In the electric vehicles 1 currently available on the market, the charging socket 1A is generally installed either at a front side (i.e., an upper part of a front bumper) of the electric vehicle 1, or at one side among two sides (i.e., an upper part of a front wheel and an upper part of a rear wheel) of the electric vehicle 1. The reference position information of the charging socket 1A denotes a relative position of the charging socket 1A based on a reference position of the corresponding electric vehicle 1.

The reference position of the electric vehicle 1 may denote the position of a specific part of the electric vehicle 1. Here, the specific part may denote a license plate of the electric vehicle 1. Therefore, if basic information of the electric vehicle 1 has been stored in the controller 300, it is possible to ascertain the relative position of the charging socket 1A on the basis of the position of the license plate. The controller 300 may determine the position of the charging socket 1A of the electric vehicle 1 parked at the stop line L using the basic information of the electric vehicle 1.

When the basic information of the electric vehicle 1 cannot be acquired in the search step S110, the controller 300 outputs a basic information input window to an output interface. The output interface may denote a display screen of the charger 400.

The controller 300 may also output a guide voice message by controlling the output interface. A driver of the electric vehicle 1 may input basic information of the electric vehicle 1 into the basic information input window. After completion of the search step S110, the moving step S120 is started.

As shown in FIG. 4, in the moving step S120 the robot arm 100 moves the charging connector 410 to the front of the charging socket 1A of the electric vehicle 1. The moving step S120 may include a pre-moving step S121, a pre-photographing step S160, a pre-matching step S123, a predicting step S124, and a post-moving step S125.

In the pre-moving step S121, the robot arm 100 is moved such that the charging connector 410 is positioned in front of the charging socket 1A. Here, the controller 300 positions the charging connector 410 in front of the charging socket 1A on the basis of the reference position information of the charging socket 1A. The cover 1B of the charging socket 1A is opened at the end stage of the moving step S120. In other words, in the pre-moving step S121, the charging connector 410 may be positioned to face the cover 1B.

In the pre-photographing step S160, the camera 230 generates real-time image information of the cover 1B by photographing the closed cover 1B of the charging socket 1A. In the pre-photographing step S160, the camera 230 may photograph the closed cover 1B of the charging socket 1A in a state in which the first lamp 211 and the second lamp 221 are turned on. The real-time image information of cover 1B denotes image data of the cover 1B that is photographed in real time.

As shown in FIG. 4, in the pre-matching step S123, real-time position information of the cover 1B is generated by matching real-time image information with reference image information of the cover 1B. Here, the reference image information of the cover 1B denotes image data in which external appearance characteristics of the cover 1B and the surroundings of the cover 1B are well displayed. Here, the external appearance characteristics may denote illuminance, chromaticity, and/or saturation.

Light radiated from the first lamp 211 and the second lamp 221 in a state in which the cover 1B is closed may be reflected from a reflection surface that approximately centers on the position of the cover 1B, and may enter a lens of the camera 230. Here, the reflection surface may denote a surface of the electric vehicle 1 that approximately centers on the cover 1B.

In a state in which the cover 1B is closed, since the surface of the electric vehicle 1 centered on the cover 1B forms a substantially smooth curved surface, light radiated from the first lamp 211 and the second lamp 221 is uniformly scatter-reflected from the surface of the electric vehicle 1, and the scatter-reflected light enters the lens of the camera 230.

Therefore, the external appearance characteristics of the cover 1B and the surroundings of the cover 1B may be well displayed in the real-time image information of the cover 1B. At this time, the similarity between the real-time image information of the cover 1B and the reference image information may be recognized with a high degree of probability.

The real-time position information of the cover 1B denotes real-time position data of the cover 1B. That is, in the pre-matching step S123, the controller 300 generates real-time position information of the cover 1B on the basis of the reference position of the electric vehicle 1 by matching the real-time image information of the cover 1B with the reference image information.

As shown in FIG. 4, in the predicting step S124, predicted position information of the charging socket 1A is generated based on the real-time position information of the cover 1B and relative position information of the charging socket 1A. The relative position information of the charging socket 1A denotes relative position data of the charging socket 1A based on the position data of the cover 1B.

In the post-moving step S125, the robot arm 100 is moved, based on the predicted position information of the charging socket 1A, such that the charging connector 410 is positioned in front of the charging socket 1A. Since the predicted position information of the charging socket 1A is based on the real-time position information of the cover 1B, there may be a discrepancy between the predicted position information of the charging socket 1A and the actual position information of the charging socket 1A due to various factors, such as partial damage or deterioration of the cover 1B.

However, even considering said discrepancy, the charging connector 410 in the post-moving step S125 is positioned more accurately in front of the connection direction of the charging socket 1A in comparison to the position of the charging connector 410 in the pre-moving step S121. Referring to FIG. 5, after completion of the post-moving step S125, the cover 1B is opened (S126) and the charging socket 1A is exposed.

Figure 6:
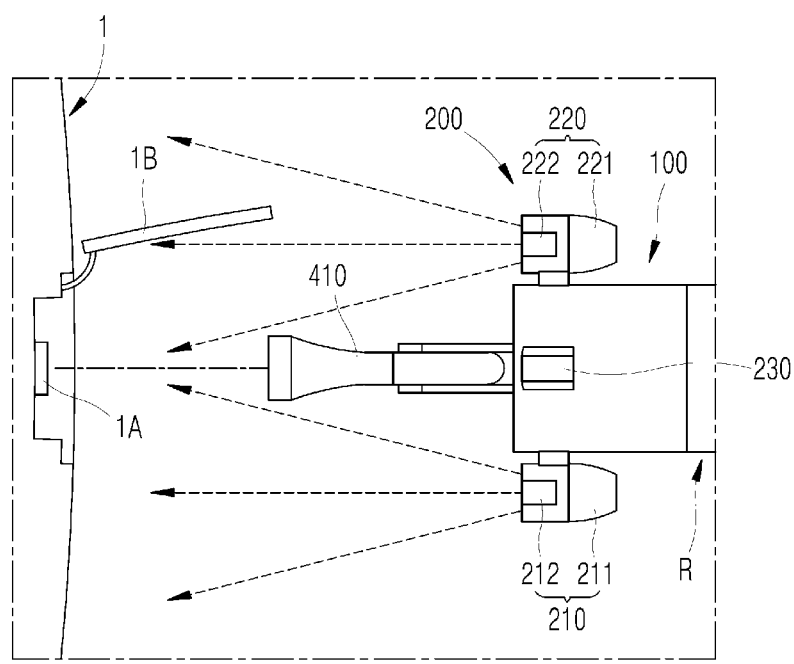
FIG. 6 is a top view illustrating a first measurement step and a second measurement step of the electric vehicle charging method shown in FIG. 4.
Figure 7:
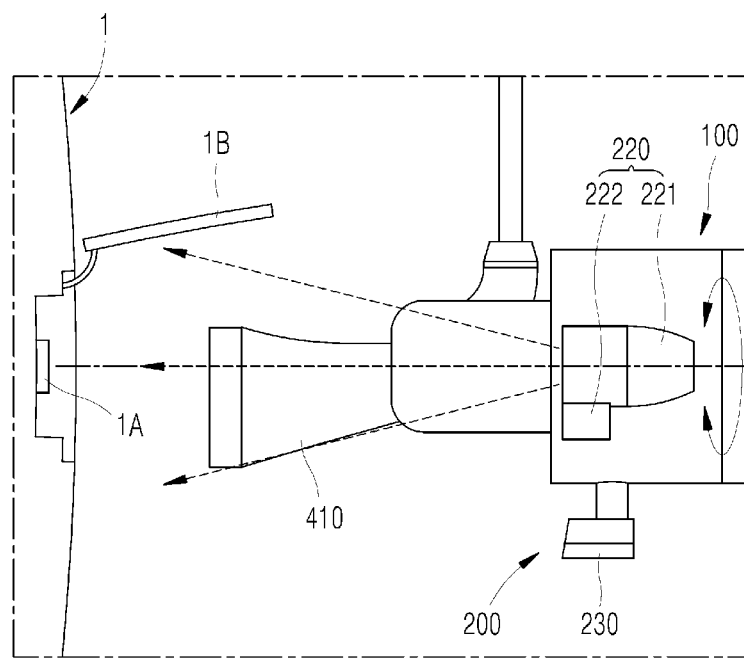
FIG. 7 is a top view illustrating a state in which the robot arm has been rotated after completion of a determining step of the electric vehicle charging method shown in FIG. 4.

FIG. 5 is a top view illustrating the moving step of the electric vehicle charging method shown in FIG. 4. FIG. 6 is a top view illustrating a first measurement step and a second measurement step of the electric vehicle charging method shown in FIG. 4. FIG. 7 is a top view illustrating a state in which the robot arm has been rotated after completion of a determining step of the electric vehicle charging method shown in FIG. 4.

Figure 9:
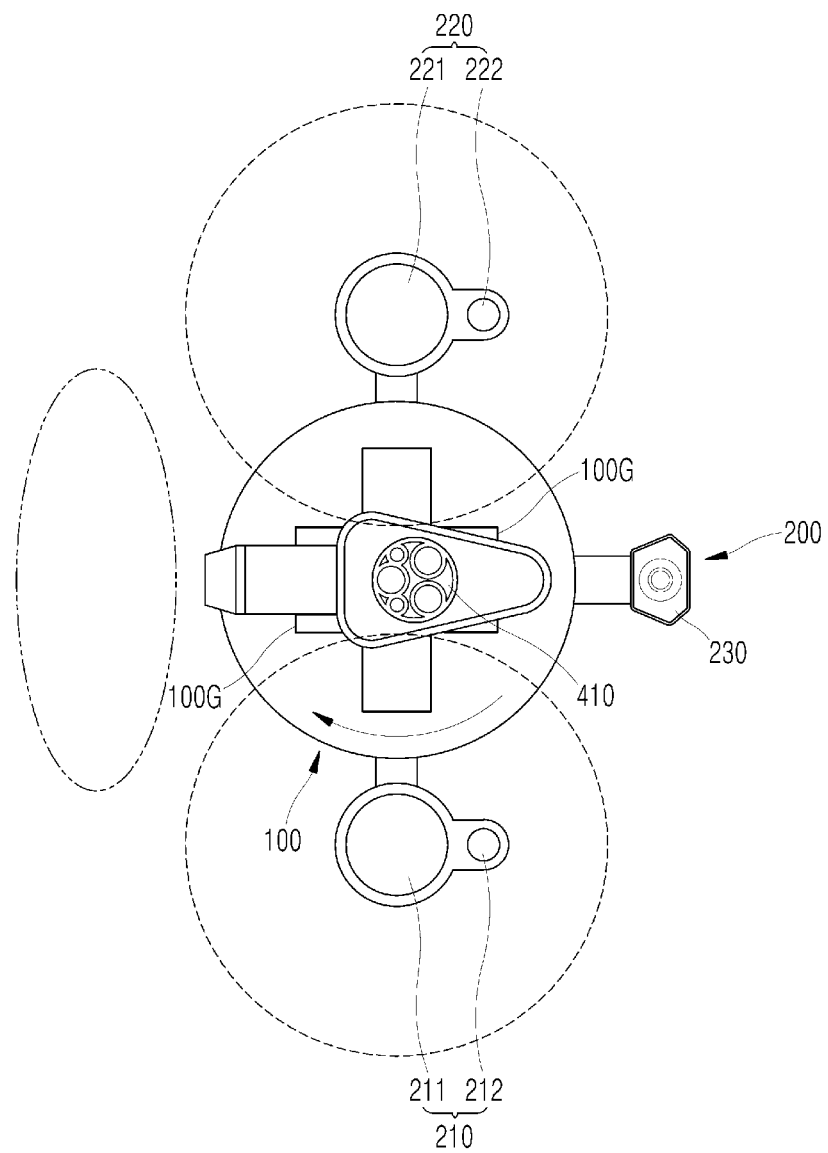
FIG. 9 is a front view illustrating a state in which the robot arm has been rotated after completion of a determining step of the electric vehicle charging method shown in FIG. 4.
Figure 10:
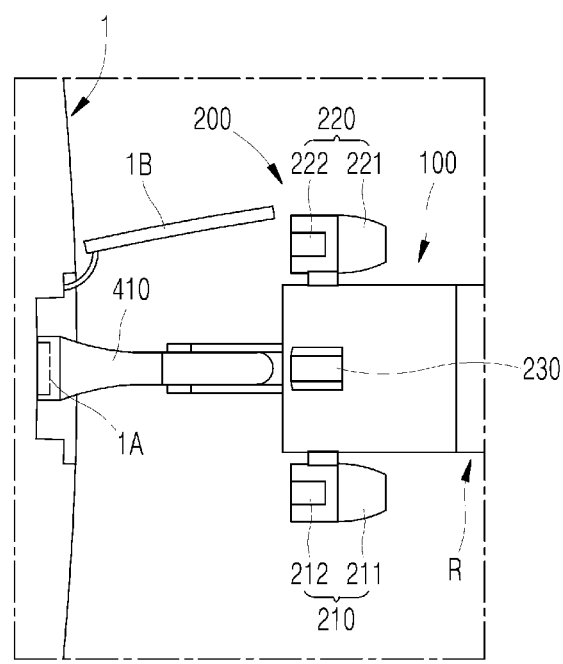
FIG. 10 is a top view illustrating a connection step of the electric vehicle charging method shown in FIG. 4.

FIG. 8 is a front view illustrating a first measurement step and a second measurement step of the electric vehicle charging method shown in FIG. 4. FIG. 9 is a front view illustrating a state in which the robot arm has been rotated after completion of a determining step of the electric vehicle charging method shown in FIG. 4. FIG. 10 is a top view illustrating a connection step of the electric vehicle charging method shown in FIG. 4.

In FIGS. 5 to 7, the alternating long and short dashed line represents a virtual line that extends in a normal direction from the center of the charging socket 1A. The charging connector 410 should be connected to the charging socket 1A by moving in the direction of the virtual line. In FIGS. 5 to 9, the dotted lines represent light radiated from the first lamp 211 and the second lamp 221. In FIGS. 8 and 9, the alternating long and short dashed line represents the cover 1B.

In FIGS. 4 and 5, after completion of the moving step S120, the first measurement step S130 and the second measurement step S140 may be started in sequence. If the cover 1B is open, there is no possibility of collision between the cover 1B and the charging connector 410.

Therefore, as shown in FIG. 6, after the cover 1B is opened (S126), the robot arm 100 may move closer to the charging socket 1A, so as to increase the amount of light radiated from the first lamp 211 and the second lamp 221 onto the charging socket 1A.

Referring to FIG. 6, in the first measurement step S130, the first lamp 211 installed in the robot arm 100 is turned on, and the second illuminance sensor 222 installed in the robot arm 100 measures illuminance of light reflected from the charging socket 1A.

In the second measurement step S140, the second lamp 221 installed in the robot arm 100 is turned on, and the first illuminance sensor 212 installed in the robot arm 100 measures illuminance of light reflected from the charging socket 1A.

That is, in a state in which the first lamp 211 is turned on, the second illuminance sensor 222 measures the illuminance of the reflected light; and in a state in which the second lamp 221 is turned on, the first illuminance sensor 212 may measure the illuminance of the reflected light. Therefore, if the reflection surface is symmetrical with respect to the axis of rotation of the robot arm 100, a measurement value of the first illuminance sensor 212 may be the same as a measurement value of the second illuminance sensor 222.

However, in a state in which the cover 1B is open, the reflection surface denotes a surface of the electric vehicle 1 that approximately centers on the charging socket 1A. Since, in a state in which the cover 1B is open, it is impossible for a surface of the electric vehicle 1 that centers on the charging socket 1A to be symmetrical with respect to the axis of rotation of the robot arm 100, a difference in measurement values between the first illuminance sensor 212 and the second illuminance sensor 222 arises. The opened cover 1B in particular may be regarded as the largest factor in reducing the symmetry of the reflection surface.

Therefore, the closer the position of the opened cover 1B is to the front of the light radiation direction of the first lamp 211 and the second lamp 221, the lower is the possibility that the real-time image information of the charging socket 1A will match the reference image information of the charging socket 1A. Here, the reference image information of the charging socket 1A denotes image data in which external appearance characteristics of the charging socket 1A and the surroundings of the charging socket 1A are well displayed. The external appearance characteristics may denote illuminance, chromaticity, and/or saturation.

As shown in FIG. 4, the determining step S150 determines whether a difference in measurement values between the first illuminance sensor 212 and the second illuminance sensor 222 is higher than a reference value.

As described above, in a state in which the cover 1B is closed, since the surface of the electric vehicle 1 centered on the closed cover 1B forms a substantially smooth curved surface, light radiated from the first lamp 211 and the second lamp 221 is uniformly scatter-reflected from the surface of the electric vehicle 1, and the scatter-reflected light enters the lens of the camera 230.

Therefore, the external appearance characteristics of the cover 1B and the surroundings of the cover 1B may be well displayed in the real-time image information of the cover 1B. In this case, the similarity between the real-time image information of the cover 1B and the reference image information may be recognized with a high degree of probability.

However, when the cover 1B is open, an imbalance may occur in the scatter-reflected light acquired from the charging socket 1A and the surroundings of the charging socket 1A, due to light being non-uniformly reflected from the opened cover 1B. As a result, when the cover 1B is open, a difference in measurement values between the first illuminance sensor 212 and the second illuminance sensor 222 unavoidably arises.

The reference value is derived based on experimental data. That is, the reference value is derived by first recording a difference in measurement values between the first illuminance sensor 212 and the second illuminance sensor 222 by performing the first measurement step S130 and the second measurement step S140, and thereafter, repeatedly performing a process of generating real-time image information of the charging socket 1A, and matching the generated real-time image information with reference image information. This process may be performed under various conditions. For example, the process may be performed for different vehicle types, and for different distances between the charging socket 1A and the image acquirer 200.

The reference value is a statistical value, and serves as a standard for determining the validity of the real-time image information of the charging socket 1A. Expressed differently, the reference value serves as a standard for determining the possibility that the real-time image information of the charging socket 1A matches the reference image information.

In other words, when the difference in measurement values between the first illuminance sensor 212 and the second illuminance sensor 222 is equal to or less than the reference value, the possibility that the real-time image information of the charging socket 1A matches the reference image information is determined to be high, based on statistical data.

As shown in FIG. 4, when the difference in measurement values between the first illuminance sensor 212 and the second illuminance sensor 222 is equal to or less than the reference value, the photographing step S160 is started. In the photographing step S160, in a state in which the first lamp 211 and the second lamp 221 are turned on, the camera 230 installed in the robot arm 100 performs photographing, resulting in real-time image information of the charging socket 1A being generated.

In the matching step S170, the real-time image information of the charging socket 1A is matched with the reference image information of the charging socket 1A, resulting in real-time position information of the charging socket 1A being generated. The real-time position information of the charging socket 1A denotes real-time position data of the charging socket 1A.

That is, in the matching step S170, the controller 300 generates the real-time position information of the charging socket 1A based on the reference position of the electric vehicle 1, by matching the real-time image information of the charging socket 1A with the reference image information of the charging socket 1A.

Referring to FIG. 10, in the connection step S180, the robot arm 100 is moved on the basis of the real-time position information of the charging socket 1A, so as to connect the charging connector 410 to the charging socket 1A.

As shown in FIG. 4, when the difference in measurement values between the first illuminance sensor 212 and the second illuminance sensor 222 is higher than the reference value in the determining step S150, a rotation step S151 is started. In the rotation step S151, the robot arm 100 is rotated about the charging connector 410. In the rotation step S151, the robot arm 100 rotates about the axis of rotation thereof.

FIGS. 6 and 8 illustrate a state in which the opened cover 1B is located close to the front of the light radiation direction of the second lamp 221. The closer the opened cover 1B is to the front of the light radiation direction of the first lamp 211 and the second lamp 221, the lower is the possibility that the real-time image information of the charging socket 1A will match the reference image information of the charging socket 1A. In other words, it should be understood that FIGS. 6 and 8 illustrate a state in which the difference in measurement values between the first illuminance sensor 212 and the second illuminance sensor 222 is higher than the reference value.

In the rotation step S151, the robot arm 100 is rotated by a predetermined angle. The purpose of rotating the robot arm 100 in the rotation step S151 is to allow the light radiation direction of the first lamp 211 and the second lamp 221 to move away from the opened cover 1B.

The cover 1B of the charging socket 1A of the electric vehicle 1 is mainly opened or closed in a horizontal direction or a vertical direction. Accordingly, in a state in which the first lamp 211 and the second lamp 221 are spaced apart from each other in the horizontal direction, the predetermined angle may be set to about 90 degrees (90°).

FIGS. 7 and 9 illustrate a state in which the robot arm 100 has been rotated by the predetermined angle. The middle point of the first lamp 211 and the second lamp 221 may coincide with the axis of rotation of the robot arm 100. Accordingly, when the robot arm 100 is rotated, each of the first lamp 211 and the second lamp 221 may move in a circumferential direction about the axis of rotation of the robot arm 100.

When the robot arm 100 is rotated by the predetermined angle, the front of the light radiation direction of the second lamp 221 moves away from the opened cover 1B. As a result, the amount of light reflected by the opened cover 1B of the charging socket 1A is minimized.

After completion of the rotation step S151, the first measurement step S130 and the second measurement step S140 are performed again. In other words, the first measurement step S130 and the second measurement step S140 are performed again, this time in a state in which the front of the light radiation direction of the second lamp 221 has moved away from the opened cover 1B. Therefore, in the subsequent determining step S150, the difference in measurement values between the first illuminance sensor 212 and the second illuminance sensor 222 may be less than the reference value.

Thereafter, the photographing step S160, the matching step S170, and the connection step S180 are performed again in sequence. In the connection step S180, the robot arm 100 is rotated and moved based on the real-time position information of the charging socket 1A, so as to connect the charging connector 410 to the charging socket 1A.

Figure 11:
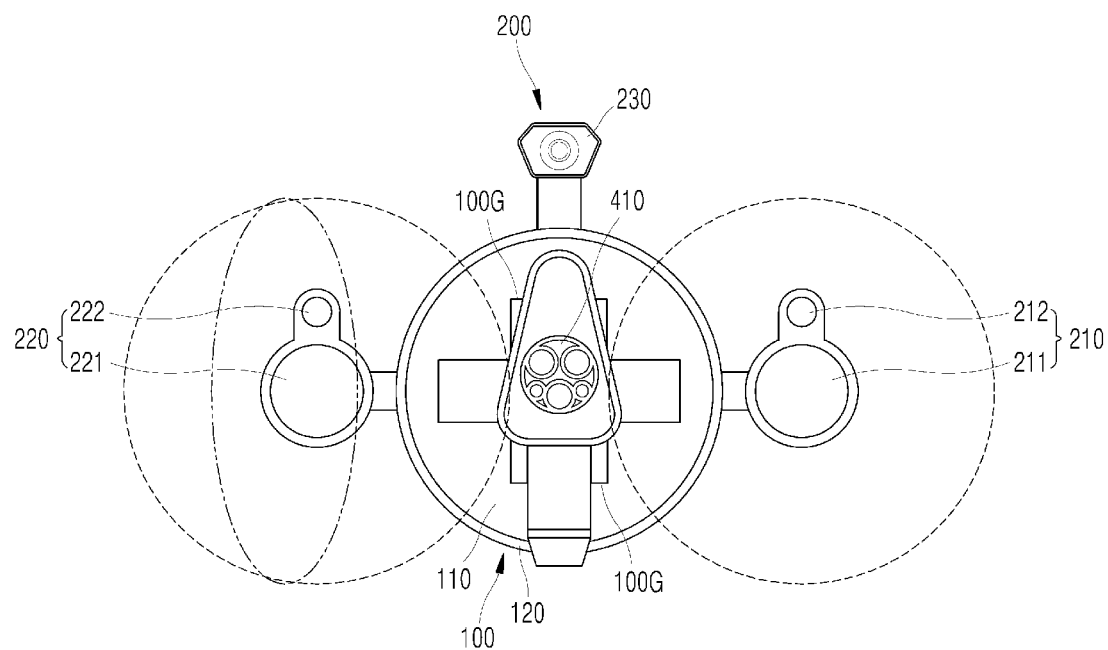
FIGS. 11 and 12 are front views illustrating a robot arm of an electric vehicle charging system according to another embodiment of the present disclosure.
Figure 12:
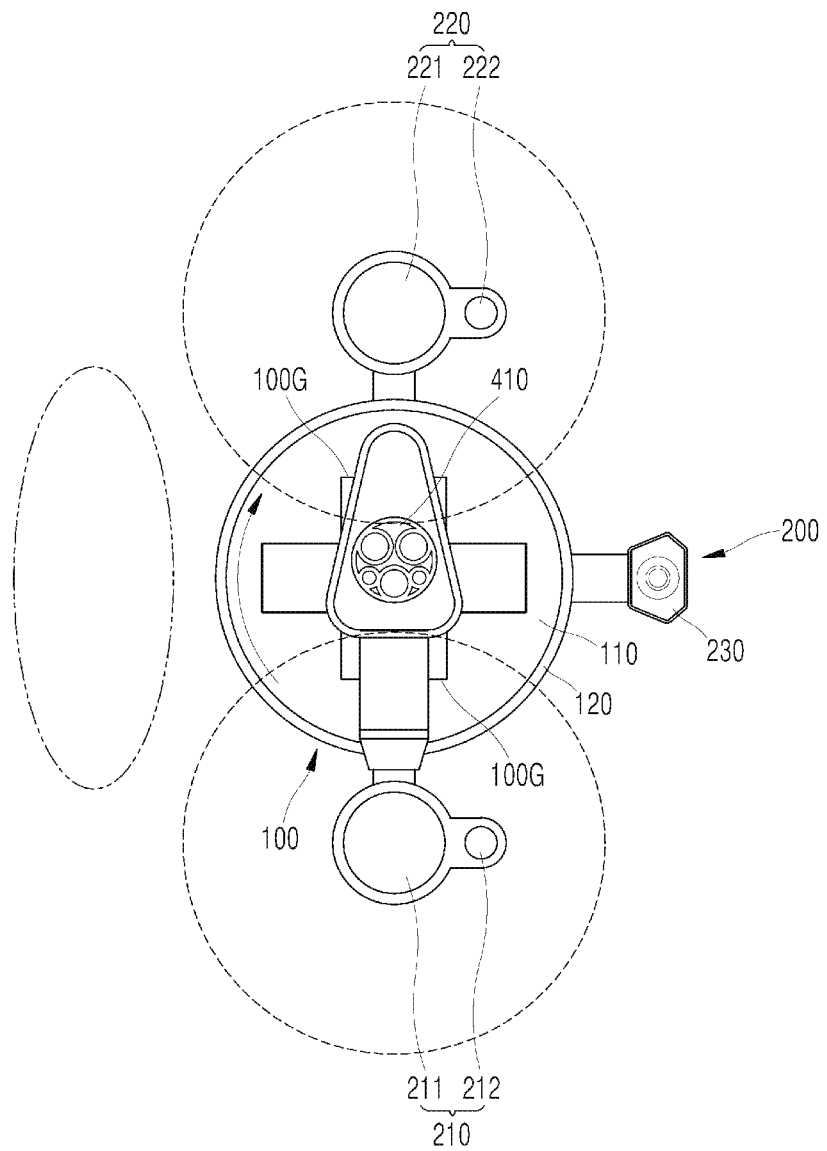

FIGS. 11 and 12 illustrate another embodiment of the robot arm. FIG. 11 illustrates a state in which the opened cover is positioned closer to the front of the light radiation direction of the second lamp, and FIG. 12 illustrates a state in which a rotating body has been rotated by a predetermined angle. As shown in FIGS. 11 and 12, the robot arm 100 may be configured to include a body 110 and a rotating body 120.

The body 110 may be configured to move and rotate the charging connector 410, and may denote the end part of a multi-axis robot arm R. A pair of grippers 100G for holding the charging connector 410 may be mounted on the body 110. The rotating body 120 may be configured to be rotatably mounted on the body 110, and may be provided with the first light controller 210 and the second light controller 220.

Although not shown in the drawings, an inner gear is coupled to the rotating body 120, and the body 110 may be provided with a stepper motor and a pinion. When the stepper motor rotates the pinion, the rotating body 120 starts to rotate. The controller 300 controls operation of the stepper motor in the rotation step S151.

According to the embodiment shown in FIGS. 8 and 9, when the robot arm 100 has rotated by the predetermined angle in the rotation step S151, the robot arm 100 should be rotated again, by approximately the predetermined angle. This is because the robot arm 100 has moved on the basis of the predicted position information of the charging socket 1A in the post-moving step S125.

According to another embodiment shown in FIGS. 11 and 12, since only the rotating body 120 rotates in the rotation step S151, in the connection step S180, the robot arm 100 is rotated by an angle smaller than the predetermined angle on the basis of the real-time position information of the charging socket 1A, and is then moved so as to connect the charging connector 410 to the charging socket 1A.

While specific embodiments of the present disclosure have been described and illustrated above, the present disclosure is not limited to the disclosed embodiments, and it will be apparent to those skilled in the art that various changes and modifications can be made without departing from the spirit and scope of the present disclosure. Accordingly, such modifications or variations are not to be regarded as a departure from the spirit or scope of the present disclosure, and it is intended that the present disclosure cover the modifications and variations of this invention provided they come within the scope of the appended claims and their equivalents.

INDUSTRIAL APPLICABILITY

According to the system and method for charging the electric vehicle disclosed in the above-mentioned embodiments of the present disclosure, when a difference in measurement values between the first illuminance sensor and the second illuminance sensor is higher than the reference value in the determining step, the electric vehicle charging system may minimize the amount of light reflected from the opened cover of the charging socket by rotating the robot arm about the charging connector, and can improve validity of an input image captured in the electric vehicle charging process by eliminating an illuminance imbalance in the charging socket due to light being reflected from the opened cover of the charging socket. Furthermore, since the present disclosure has sufficient commercial potential or sales potential, and can be practically and explicitly implemented, the present disclosure has industrial applicability.

The invention claimed is:

1. An electric vehicle charging system, comprising:
   a charging connector configured to be connected to a charging socket of an electric vehicle;
   a robot arm configured to move the charging connector;
   a camera assembly provided in the robot arm; and
   a controller configured to control the robot arm and the camera assembly,
   wherein the camera assembly includes:
      a first light controller including a first lamp and a first illuminance sensor, the first light controller being provided at a first side of the charging connector;
      a second light controller including a second lamp and a second illuminance sensor, the second light controller being provided at a second side of the charging connector, the second side of the charging connector being opposite to the first side of the charging connector; and
      a camera,
   wherein the first illuminance sensor is configured to measure illuminance of light reflected by the charging socket while the second lamp is turned on, to obtain a first measurement value,
   wherein the second illuminance sensor is configured to measure illuminance of light reflected by the charging socket while the first lamp is turned on, to obtain a second measurement value, and
   wherein the camera is configured to capture an image of the charging socket when the first lamp and the second lamp are turned on, and when a difference between the first measurement value and the second measurement value is equal to or less than the reference value.

2. The system according to claim 1, wherein the robot arm further includes:
   a first body configured to hold the charging connector; and
   a second body rotatably mounted on the first body, the second body including the camera assembly, and
   wherein the controller is further configured to rotate the second body when the difference between the first measurement value and the second measurement value is higher than the reference value.

3. The system according to claim 1, further including:
   an inner gear coupled to the second body;
   a stepper motor provided in the first body; and
   a pinion provided in the first body;
   wherein the controller is further configured to operate the stepper motor to rotate the pinion, and
   wherein the second body is configured to rotate when the pinion rotates.

4. The system according to claim 1, wherein the controller is further configured to, when the difference between the first measurement value and the second measurement value is greater than the reference value:
   determine that the charging socket has an opened cover,
   control the robot arm to rotate about the charging connector to minimize an amount of light reflected by the opened cover of the charging socket, and
   control the camera to capture an image of the charging socket.

5. The system according to claim 4, wherein a middle point between the first lamp and the second lamp coincides with an axis of rotation of the robot arm, and
   wherein when the robot arm rotates, the first lamp and the second lamp move in a circumferential direction about the axis of rotation of the robot arm.

6. The system according to claim 5, wherein an angle between the camera and the first lamp with respect to the axis of rotation of the robot arm is identical to an angle between the camera and the second lamp with respect to the axis of rotation of the robot arm.

7. An electric vehicle charging system, comprising:
   a charging connector configured to be connected to a charging socket of an electric vehicle;
   a robot arm configured to move the charging connector;
   a first light controller configured to:
      radiate light to the charging socket, and
      measure illuminance of light reflected from the charging socket to obtain a first measurement value;
   a second light controller configured to:
      radiate light to the charging socket, and
      measure illuminance of light from the charging socket to obtain a second measurement value;
   a camera provided in the robot arm, the camera being configured to capture an image of the charging socket; and
   a controller configured to:
      control the camera to capture the image of the charging socket, when a difference between the first measurement value and the second measurement value is equal to or less than a reference value,
      determine position information of the charging socket relative to the electric vehicle based on the captured image, and
      store the position information of the charging socket relative to the electric vehicle in memory.

8. The system according to claim 7, wherein the first light controller is provided at a first side of the charging connector,
   wherein the second light controller is provided at a second side of the charging connector, the second side of the charging connector being opposite to the first side of the charging connector,
   wherein the first light controller is configured to measure illuminance of the radiated light, while the second light controller radiates light, and
   wherein the second light controller is configured to measure illuminance of the radiated light while the first light controller radiates light.

9. The system according to claim 7, wherein the controller is further configured to, when the difference the first measurement value and the second measurement value is greater than the reference value:
   determine that the charging socket has an opened cover,
   control the robot arm to rotate about the charging connector to minimize an amount of light reflected by the opened cover of the charging socket, and
   control the camera to capture an image of the charging socket.

10. The system according to claim 9, wherein an angle between the camera and the first light controller with respect to an axis of rotation of the robot arm is identical to an angle between the camera and the second light controller with respect to the axis of rotation of the robot arm.

11. A method of charging an electric vehicle having a charging socket, the method comprising:
    providing an electric vehicle charging system, including:
       a charging connector; and
       a robot arm, the robot arm including:
          a first light controller including a first lamp and a first illuminance sensor; and
          a second light controller including a second lamp and a second illuminance sensor;

positioning the charging connector, by the robot arm, in front of the charging socket;

measuring, by the first illuminance sensor, light reflected by the charging socket, to obtain a first measurement value;

measuring, by the second illuminance sensor, light reflected by the charging socket, to obtain a second measurement value;

capturing an image of the charging socket to generate real-time image information of the charging socket, when a difference between the first measurement value and the second measurement value is equal to or less than a reference value;

comparing the real-time image information of the charging socket with reference image information of the charging socket, to generate real-time position information of the charging socket; and connecting the charging connector to the charging socket by moving the robot arm, based on the real-time position information of the charging socket.

12. The method according to claim 11, wherein the first lamp and the first illuminance sensor are provided at a first side of the charging connector, and wherein the second lamp and the second illuminance sensor are provided at a second side of the charging connector, the second side of the charging connector being opposite to the first side of the charging connector.

13. The method according to claim 11, wherein the measuring, by the second illuminance sensor, light reflected by the charging socket, is performed while the first lamp is turned on, and wherein the measuring, by the first illuminance sensor, light reflected by the charging socket, is performed while the second lamp is turned on.

14. The method according to claim 11, wherein the robot arm further includes a pair of grippers, and wherein the method further includes holding the charging connector with the grippers.

15. The method according to claim 11, wherein the method further comprises, when the difference between the first measurement value and the second measurement value is greater than the reference value, rotating the robot arm about the charging connector until the difference between the first measurement value and the second measurement value is equal to or less than the reference value, and then:

capturing an image of the charging socket to generate real-time image information of the charging socket;

matching the real-time image information of the charging socket with the reference image information of the charging socket, so as to generate the real-time position information of the charging socket; and connecting the charging connector to the charging socket by moving the robot arm, based on the real-time position information of the charging socket.

16. The method according to claim 15, wherein a middle point between the first lamp and the second lamp coincides with an axis of rotation of the robot arm, and wherein when the robot arm rotates, the first lamp and the second lamp move in a circumferential direction about the axis of rotation of the robot arm.

17. The method according to claim 11, wherein the positioning the charging connector in front of the charging socket includes:

moving the robot arm based on reference position information of the charging socket;

capturing a closed cover of the charging socket by the camera, while the first lamp and the second lamp are turned on, to generate real-time image information of the cover;

generating real-time position information of the cover by matching the real-time image information of the cover with reference image information of the cover;

generating predicted position information of the charging socket based on the real-time position information of the cover and relative position information of the charging socket; and moving the robot arm in front of the charging socket, based on the predicted position information of the charging socket.

18. The method according to claim 17, wherein after positioning the robot arm in front of the charging socket, based on the predicted position information of the charging socket, the method further comprises:

opening the cover to expose the charging socket, and moving the robot arm toward the charging socket to increase an amount of light radiated to the charging socket from the first lamp and the second lamp.

19. The method according to claim 11, wherein prior to the positioning the charging connector in front of the charging socket, the method further comprises:

capturing, by a surveillance camera, a license plate of the electric vehicle; and determining whether basic information of the electric vehicle, based on the license plate, is stored in memory.

20. The method according to claim 19, wherein the electric vehicle charging system further includes an output interface, wherein the method further comprises outputting a basic information input window to the output interface, when the basic information of the electric vehicle is not stored in memory, and wherein the basic information input window includes an input for type information of the electric vehicle and for reference position information of the charging socket.

* * * * *